(12) United States Patent
Feno

(10) Patent No.: US 9,502,987 B1
(45) Date of Patent: Nov. 22, 2016

(54) CIRCUIT AND METHOD FOR MANAGING COMMON MODE NOISE IN ISOLATED RESONANT DC-DC POWER CONVERTERS

(71) Applicant: PAI Capital LLC, San Jose, CA (US)

(72) Inventor: Ivan Feno, Bertschikon (CH)

(73) Assignee: PAI CAPITAL LLC, Santa Clara, CA (US)

( * ) Notice: Subject to any disclaimer, the term of this patent is extended or adjusted under 35 U.S.C. 154(b) by 0 days.

(21) Appl. No.: 14/611,374

(22) Filed: Feb. 2, 2015

Related U.S. Application Data

(60) Provisional application No. 61/936,535, filed on Feb. 6, 2014.

(51) Int. Cl.
*H02M 3/335* (2006.01)

(52) U.S. Cl.
CPC .................. *H02M 3/33546* (2013.01)

(58) Field of Classification Search
CPC .............. H02M 3/00; H02M 7/003; H02M 2001/0012; H02M 2001/0074; H02M 2001/346; H02M 5/225
See application file for complete search history.

(56) References Cited

U.S. PATENT DOCUMENTS

| | | | | | |
|---|---|---|---|---|---|
| 3,487,289 A | * | 12/1969 | McMurray | ............ | H02M 5/225 363/136 |
| 3,582,756 A | * | 6/1971 | McMurray | ............ | H02M 5/225 330/10 |
| 4,410,935 A | * | 10/1983 | Dang | .................. | H02H 7/1225 363/37 |
| 4,853,832 A | * | 8/1989 | Stuart | ................. | H02M 3/3376 363/17 |
| 4,860,189 A | * | 8/1989 | Hitchcock | ........... | H02M 7/5387 363/132 |
| 5,198,969 A | * | 3/1993 | Redl | ..................... | H02M 3/337 363/132 |
| 5,235,501 A | * | 8/1993 | Stuart | ................. | H02M 3/3376 363/132 |
| 5,448,467 A | * | 9/1995 | Ferreira | ............. | H02M 3/3376 363/132 |
| 5,594,635 A | * | 1/1997 | Gegner | ................. | H02M 3/158 363/124 |
| 5,946,200 A | * | 8/1999 | Kim | ....................... | H02M 1/34 363/132 |

(Continued)

OTHER PUBLICATIONS

Yang et al: "Analysis and Reduction of Common Mode EMI Noise for Resonant Converters", The Bradley Department of Electrical and Computer Engineering,Virginia Tech, Blacksburg, VA 24061 USA, 978-1-4799-2325-01/14 2014 IEEE.

*Primary Examiner* — Timothy J Dole
*Assistant Examiner* — Yusef Ahmed
(74) *Attorney, Agent, or Firm* — Patterson Intellectual Property Law, P.C.; Mark J. Patterson; Gary L. Montle

(57) ABSTRACT

A resonant DC/DC power converter is provided with isolated primary and secondary circuits. The primary circuit includes at least four switches as first and second pairs in a bridge configuration, an isolation transformer having at least one primary and at least one secondary winding, and a resonant tank including a resonant capacitor and a split resonant inductor having two separate windings. In one embodiment, the split resonant inductor windings are substantially identical. Synchronous switching of diagonally opposed switch pairs in the bridge configuration thereby produces a center point voltage of the primary transformer winding is substantially free of stepwise voltage changes.

16 Claims, 6 Drawing Sheets

(56) References Cited

U.S. PATENT DOCUMENTS

| | | | | |
|---|---|---|---|---|
| 6,111,770 A * | 8/2000 | Peng | H02M 7/4826 | 363/131 |
| 6,252,782 B1 * | 6/2001 | Akashi | H02M 3/3378 | 363/132 |
| 6,307,760 B1 * | 10/2001 | Ikimi | H02M 5/4585 | 363/37 |
| 6,310,785 B1 * | 10/2001 | Ayyanar | H02M 3/337 | 363/132 |
| 6,483,724 B1 * | 11/2002 | Blair | H02M 1/44 | 363/132 |
| 6,650,551 B1 * | 11/2003 | Melgarejo | H02M 1/34 | 363/16 |
| 6,930,893 B2 | 8/2005 | Vinciarelli | | |
| 6,944,036 B2 * | 9/2005 | Yan | H02M 1/34 | 323/363 |
| 7,170,764 B2 * | 1/2007 | Vinciarelli | H02M 3/1584 | 307/82 |
| 7,408,795 B2 * | 8/2008 | Vinciarelli | H02M 3/157 | 323/265 |
| 7,548,441 B2 * | 6/2009 | Vinciarelli | H02M 3/157 | 323/265 |
| 7,598,792 B2 * | 10/2009 | Liu | H02M 1/08 | 327/494 |
| 7,817,452 B2 * | 10/2010 | Smith | H02M 3/33569 | 363/132 |
| 7,831,401 B2 * | 11/2010 | Jungreis | H02M 3/337 | 323/235 |
| 8,441,815 B2 * | 5/2013 | Mayell | H02M 3/335 | 363/18 |
| 8,564,984 B2 * | 10/2013 | Mao | H02M 3/28 | 363/21.02 |
| 2003/0142513 A1 * | 7/2003 | Vinciarelli | H02J 1/102 | 363/17 |
| 2003/0227280 A1 * | 12/2003 | Vinciarelli | H02M 1/088 | 323/265 |
| 2004/0257272 A1 * | 12/2004 | Jacobson | H01Q 3/30 | 342/175 |
| 2005/0254272 A1 * | 11/2005 | Vinciarelli | H02M 3/157 | 363/65 |
| 2008/0198634 A1 * | 8/2008 | Scheel | H02M 3/158 | 363/21.02 |
| 2008/0247194 A1 * | 10/2008 | Ying | H02M 3/3376 | 363/17 |
| 2011/0007528 A1 * | 1/2011 | Scheel | H02M 3/33523 | 363/21.03 |
| 2012/0229034 A1 * | 9/2012 | Yu | H02M 3/3376 | 315/186 |
| 2013/0033904 A1 * | 2/2013 | Ye | H02M 3/33576 | 363/17 |
| 2013/0265804 A1 * | 10/2013 | Fu | H02M 3/33576 | 363/17 |
| 2014/0153290 A1 * | 6/2014 | Li | H02M 3/3376 | 363/17 |

* cited by examiner

CIRCUIT AND METHOD FOR MANAGING COMMON MODE NOISE IN ISOLATED RESONANT DC-DC POWER CONVERTERS

CROSS-REFERENCES TO RELATED APPLICATIONS

This application claims benefit of U.S. Provisional Patent Application No. 61/936,535, filed Feb. 6, 2013, and which is hereby incorporated by reference.

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

BACKGROUND OF THE INVENTION

The present invention relates generally to the field of electrical power conversion, particularly to isolated resonant converters required to provide low common mode noise.

Isolated DC/DC converters often experience common mode (CM) noise that is present between the primary and secondary terminals. The common mode noise is typically generated by unbalanced currents flowing through the inter-winding capacitances of the isolation transformer generated during switching operation of the converter.

One example of a prior art converter 10 is shown in FIG. 1. The converter includes an isolation transformer T with depicted inter-winding capacitances Ci1 and Ci2 representing lumped components of the real structure. The inter-winding capacitances typically define a capacitive coupling between the primary and secondary circuits of the converter. Because of the capacitive coupling, a primary center point voltage Vm can be used to predict common mode voltage Vcm present between the primary and secondary circuits. This can be predicted by means of experimental measurement or by circuit model simulation of the circuit.

For a converter 10 according to FIG. 1, the primary center point voltage Vm voltage is graphically represented as 21 on FIG. 2, where the voltage of an input source V1 is marked for reference. As shown on FIG. 2, the center point voltage Vm features low frequency components and voltage transients with higher dv/dt. The high dv/dt voltage transients cause high capacitive currents through the inter-winding capacitances Ci1/Ci2 which are difficult to damp. Therefore the center point voltage Vm and consequently the common mode voltage Vcm tend to oscillate at high frequency.

It can be demonstrated that if the primary center point voltage Vm is stable, then noise currents flowing through the inter-winding capacitances Ci1 and Ci2 cancel each other and the common mode voltage Vcm between the primary and secondary circuits is minimized.

One solution as has previously been known in the art is to decrease the common mode voltage of a DC/DC converter 30 having a topology as represented in FIG. 3. This topology is useful in applications where the resonant choke of the converter is represented by a leakage inductance of the isolation transformer. However, it does not offer a solution for applications where a discrete resonant choke is used.

Therefore, a solution which provides low common mode voltage and includes a discrete resonant choke is required.

BRIEF SUMMARY OF THE INVENTION

According to one exemplary embodiment of an invention according to the present invention, a resonant DC/DC converter includes a primary circuit and a secondary circuit. The primary circuit has at least four switches configured as primary switches in a bridge configuration, an isolation transformer with at least one primary and one secondary winding, and a resonant tank having a resonant capacitor and a split resonant inductor with two separate windings. The secondary circuit is coupled to a secondary winding of the isolation transformer whereby the center voltage of the primary transformer winding is substantially free of stepwise voltage changes.

In an exemplary aspect of such an embodiment, the two separate windings of the split resonant inductor may be structurally identical or otherwise comprise substantially equivalent parasitic capacitances.

In another exemplary aspect, the split resonant inductor substantially shares a common path of magnetic flux.

In another exemplary aspect, the split resonant inductor may further be characterized by an m:n inductance ratio of substantially 1:1. Alternatively, the m:n inductance ratio may be different from 1:1, having a value provided to further optimize a common mode voltage between the primary and secondary circuits.

In another exemplary aspect, the split resonant inductor may be comprised of two independent inductors.

In another exemplary aspect, the resonant capacitor may be a single component, or in certain embodiments may be split into two separate components, wherein the split resonant inductor may further substantially share the common path of magnetic flux.

In another exemplary aspect, the secondary circuit may include a rectifier circuit coupled across the secondary isolation transformer winding and configured to produce a DC output to a load. In one embodiment, the rectifier circuit may include a plurality of synchronous rectifier switching elements arranged in a bridge configuration. In another embodiment, the rectifier circuit may include a plurality of synchronous rectifier switching elements arranged in a center-tap configuration.

In another exemplary aspect, the resonant circuit may be defined as including first and second impedance circuits coupled to nodes between the respective first and second pairs of switching elements. The impedance circuits include respective impedance values that are substantially identical, wherein synchronous switching of opposing pairs of switching elements in the inverter bridge produces a center point voltage of the isolation transformer that is substantially a DC voltage.

DETAILED DESCRIPTION OF THE INVENTION

Figure 1:
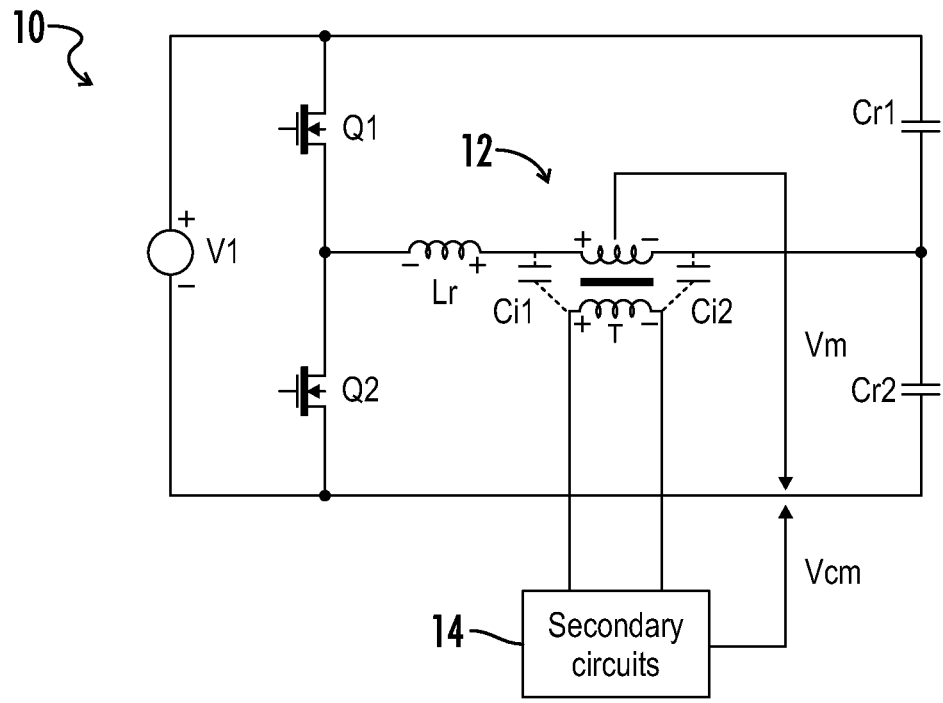
FIG. 1 is a circuit diagram representing an exemplary resonant converter as conventionally known in the art.
Figure 2:
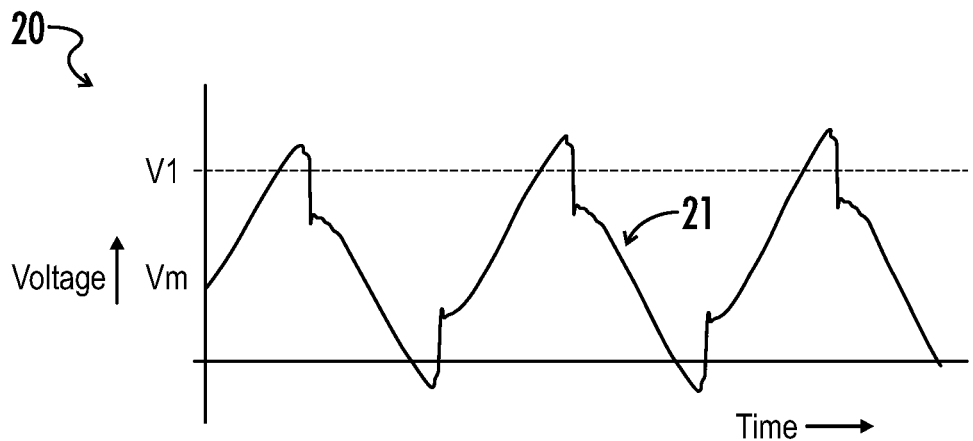
FIG. 2 is a graphical diagram representing a primary center point voltage Vm of the prior art converter according to FIG. 1.
Figure 3:
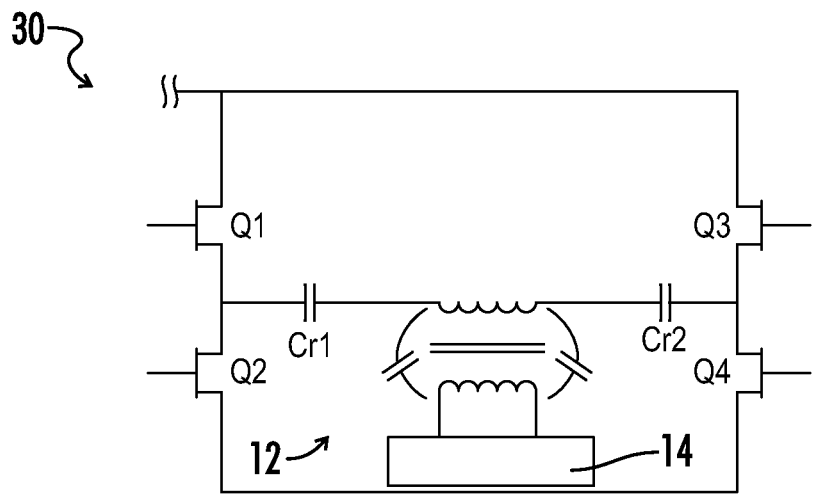
FIG. 3 is a circuit diagram representing a resonant converter of the prior art with a suppressed common mode voltage present between a primary side and a secondary side of the converter.

Throughout the specification and claims, the following terms take at least the meanings explicitly associated herein, unless the context dictates otherwise. The meanings identified below do not necessarily limit the terms, but merely provide illustrative examples for the terms. The meaning of "a," "an," and "the" may include plural references, and the meaning of "in" may include "in" and "on." The phrase "in one embodiment," as used herein does not necessarily refer to the same embodiment, although it may.

The term "coupled" means at least either a direct electrical connection between the connected items or an indirect connection through one or more passive or active intermediary devices.

The term "circuit" means at least either a single component or a multiplicity of components, either active and/or passive, that are coupled together to provide a desired function. Terms such as "wire," "wiring," "line," "signal," "conductor," and "bus" may be used to refer to any known structure, construction, arrangement, technique, method and/or process for physically transferring a signal from one point in a circuit to another. Also, unless indicated otherwise from the context of its use herein, the terms "known," "fixed," "given," "certain" and "predetermined" generally refer to a value, quantity, parameter, constraint, condition, state, process, procedure, method, practice, or combination thereof that is, in theory, variable, but is typically set in advance and not varied thereafter when in use.

The terms "switching element" and "switch" may be used interchangeably and may refer herein to at least: a variety of transistors as known in the art (including but not limited to FET, BJT, IGBT, JFET, etc.), a switching diode, a silicon controlled rectifier (SCR), a diode for alternating current (DIAC), a triode for alternating current (TRIAC), a mechanical single pole/double pole switch (SPDT), or electrical, solid state or reed relays. Where either a field effect transistor (FET) or a bipolar junction transistor (BJT) may be employed as an embodiment of a transistor, the scope of the terms "gate," "drain," and "source" includes "base," "collector," and "emitter," respectively, and vice-versa.

The terms "power converter" and "converter" unless otherwise defined with respect to a particular element may be used interchangeably herein and with reference to at least DC-DC, DC-AC, AC-DC, buck, buck-boost, boost, half-bridge, full-bridge, H-bridge or various other forms of power conversion or inversion as known to one of skill in the art.

Terms such as "providing," "processing," "supplying," "determining," "calculating" or the like may refer at least to an action of a computer system, computer program, signal processor, logic or alternative analog or digital electronic device that may be transformative of signals represented as physical quantities, whether automatically or manually initiated.

The terms "controller," "control circuit" and "control circuitry" as used herein may refer to, be embodied by or otherwise included within a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed and programmed to perform or cause the performance of the functions described herein. A general purpose processor can be a microprocessor, but in the alternative, the processor can be a controller, microcontroller, or state machine, combinations of the same, or the like. A processor can also be implemented as a combination of computing devices, e.g., a combination of a DSP and a microprocessor, a plurality of microprocessors, one or more microprocessors in conjunction with a DSP core, or any other such configuration.

Referring generally to FIGS. 4-12, various embodiments of a power converter according to the present invention may now be described in greater detail. Where the various figures may describe embodiments sharing various common elements and features with other embodiments, similar elements and features are given the same reference numerals and redundant description thereof may be omitted below.

Figure 4:
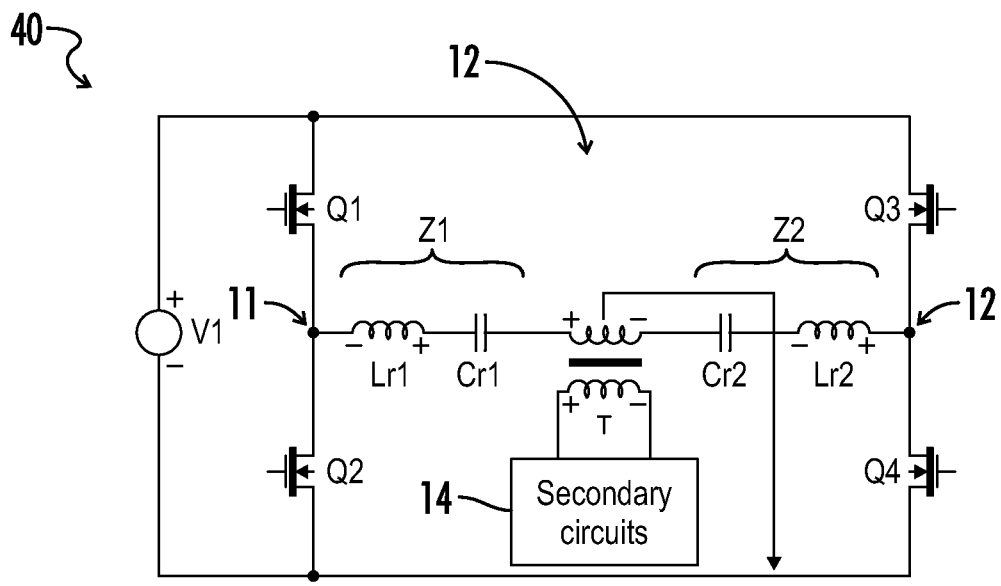
FIG. 4 is a circuit diagram representing an exemplary embodiment of a power converter according to the present invention.

Referring first to FIG. 4, one exemplary embodiment 40 of a symmetrical resonant converter (SyRC) according to the present invention includes a full-bridge inverter stage with switching elements Q1-Q4, a primary circuit 12 disposed along a lateral branch 12 (e.g., including a primary winding of isolation transformer T, a split resonant choke Lr1/Lr2, a split resonant capacitor Cr1/Cr2) and a secondary circuit 14 (e.g., including or coupled to a secondary winding of isolation transformer T). The components in the lateral branch may define first and second impedance circuits, with the first impedance circuit in the example shown including the first split resonant inductor winding Lr1 and the first split resonant capacitance Cr1 and having an impedance value Z1, and with the second impedance circuit including the second split resonant inductor winding Lr2 and the second split resonant capacitance Cr2 and having an impedance value Z2.

Figure 12:
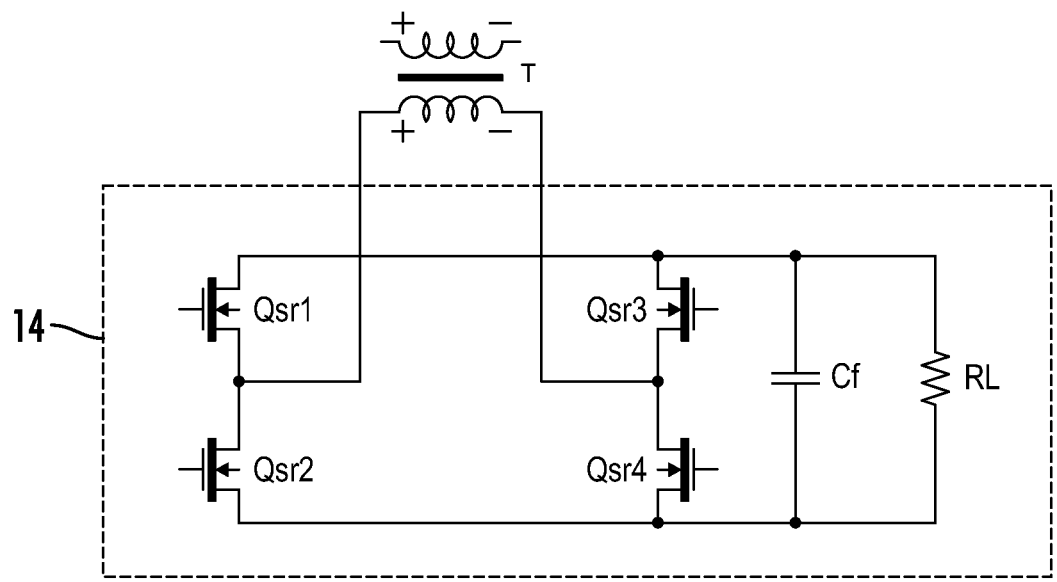
FIG. 12 is a circuit diagram representing an example of a secondary circuit that may be used with various embodiments of a power converter according to the present invention.

Many forms of secondary circuits 14 may be used, such as for example that illustrated in FIG. 12. In the example shown, a rectifier circuit is coupled across the secondary winding of the isolation transformer T, which may include a bridge of synchronous rectifier switching elements Qsr1-Qsr4. A filtering capacitor Cf and a load $R_L$ are coupled across an output of the rectifier circuit.

Figure 5:
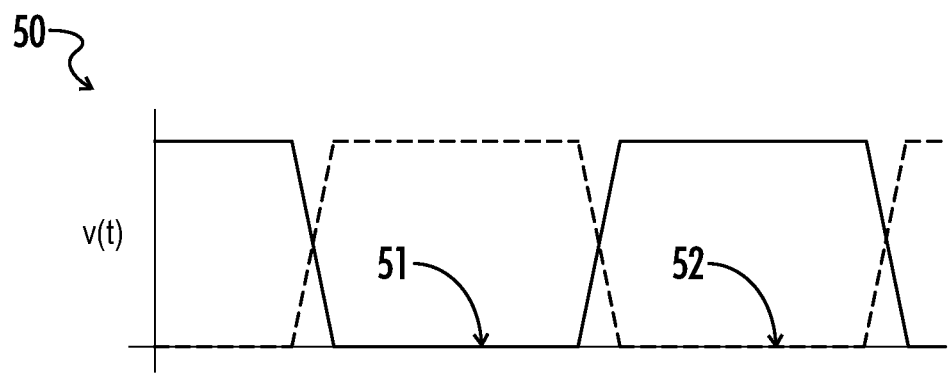
FIG. 5 is a graphical diagram representing exemplary switching voltage waveforms to emphasize an operation description of the topology according to an exemplary embodiment of a power converter according to the present invention.
Figure 6:
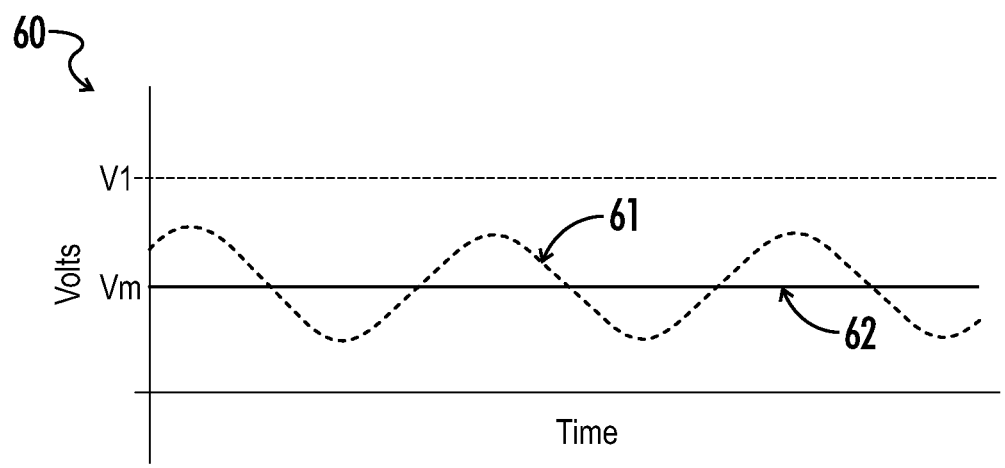
FIG. 6 is a graphical diagram depicting a primary center point voltage Vm of the converter according to embodiments according to the present invention.

If the full-bridge inverter is controlled symmetrically, e.g. wherein diagonally opposed switching elements Q1 and Q4 are controlled for switching synchronously, and likewise diagonally opposed switching elements Q2 and Q3 are controlled for switching synchronously but with a 180 degrees shift with respect to Q1 and Q4, then the resultant switching voltages 51 and 52 may be characterized by the symmetrical waveforms depicted on FIG. 5. Assuming further that the respective impedance values Z1 and Z2 are equivalent, then the primary center point voltage Vm of the isolation transformer T is substantially a DC voltage 62 as depicted on FIG. 6. Consequently, the capacitive currents flowing through the inter-winding capacitances of the isolation transformer T will be minimized because there are no stepwise voltage changes, resulting in a low common mode noise present between the primary 12 and secondary 14 circuits.

Note that within switching transients, impedance values Z1 and Z2 are mainly defined or otherwise associated with the split inductor windings Lr1 and Lr2 because the impedances of resonant capacitors Cr1 and Cr2 are relatively, and generally substantially, lower. However, the parasitic capacitances of Lr1 and Lr2 may typically be kept substantially equal. Therefore, equivalent physical structures of chokes Lr1 and Lr2 are preferred to avoid unbalanced inter-winding capacitance currents.

Figure 7:
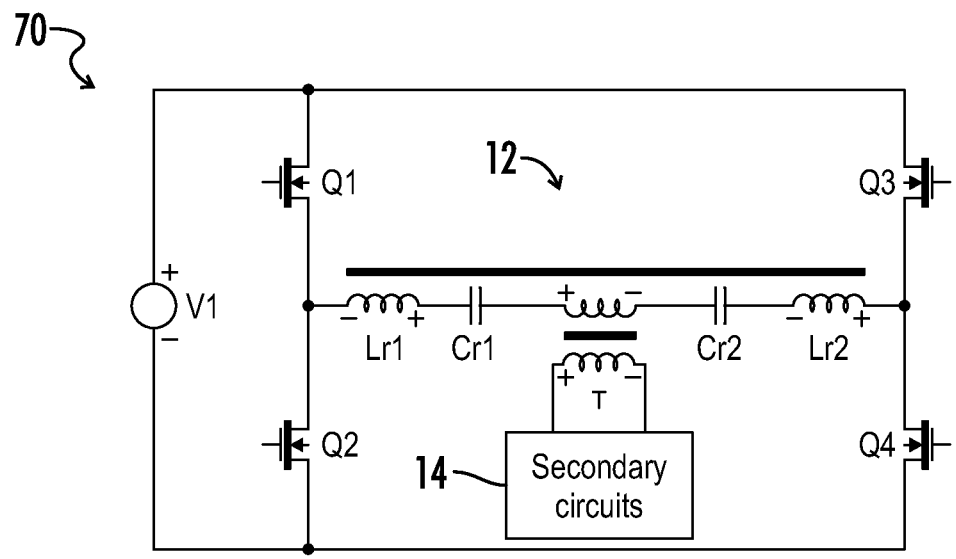
FIG. 7 is a circuit diagram representing another topology of a power converter according to an embodiment according to the present invention, where the magnetic flux of both resonant chokes Lr1 and Lr2 share the same path.
Figure 8:
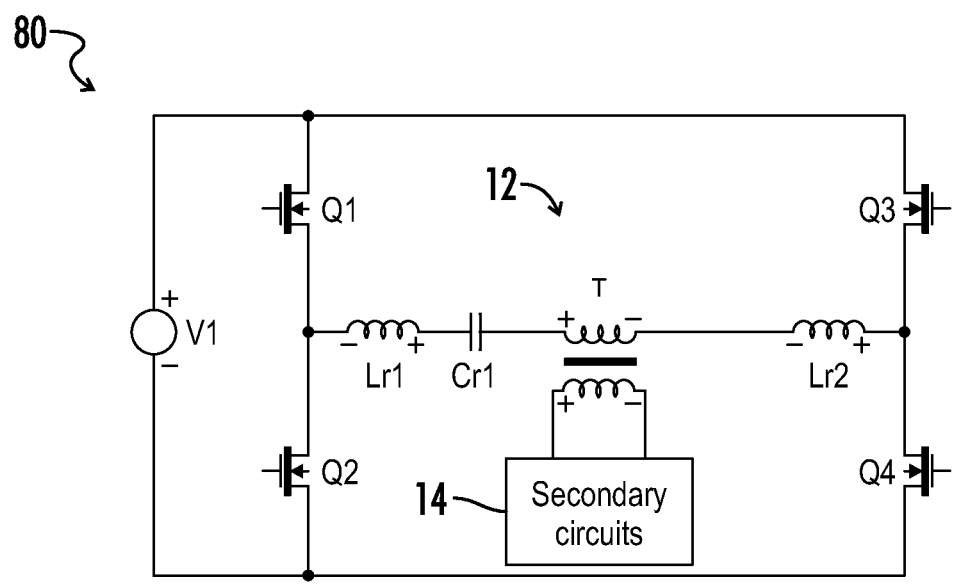
FIG. 8 is a circuit diagram representing another topology of a power converter according to an embodiment according to the present invention, where a split resonant capacitor is integrated as a single component.
Figure 9:
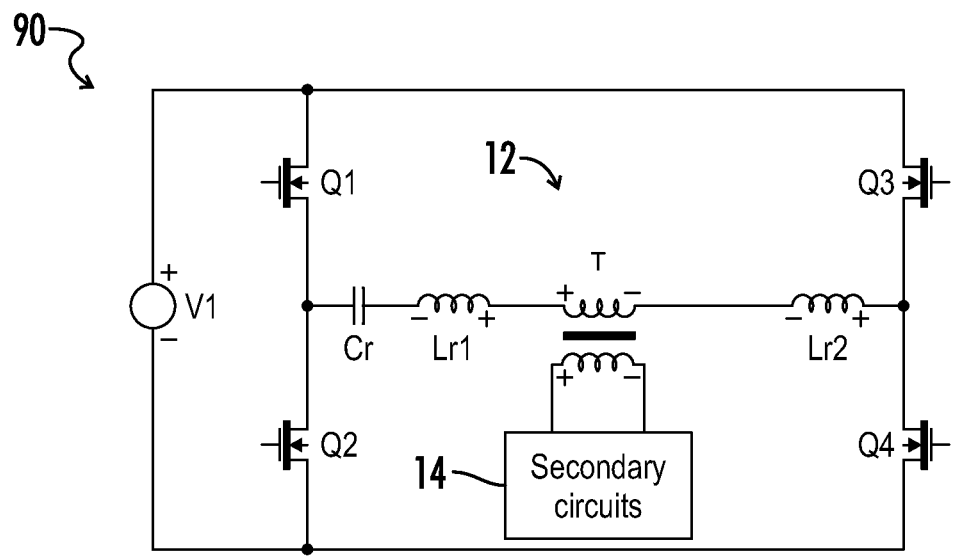
FIG. 9 is a circuit diagram representing another topology of a power converter according to an embodiment according to the present invention, wherein a resonant capacitor is connected between a switching branch and the Lr1 inductor.
Figure 10:
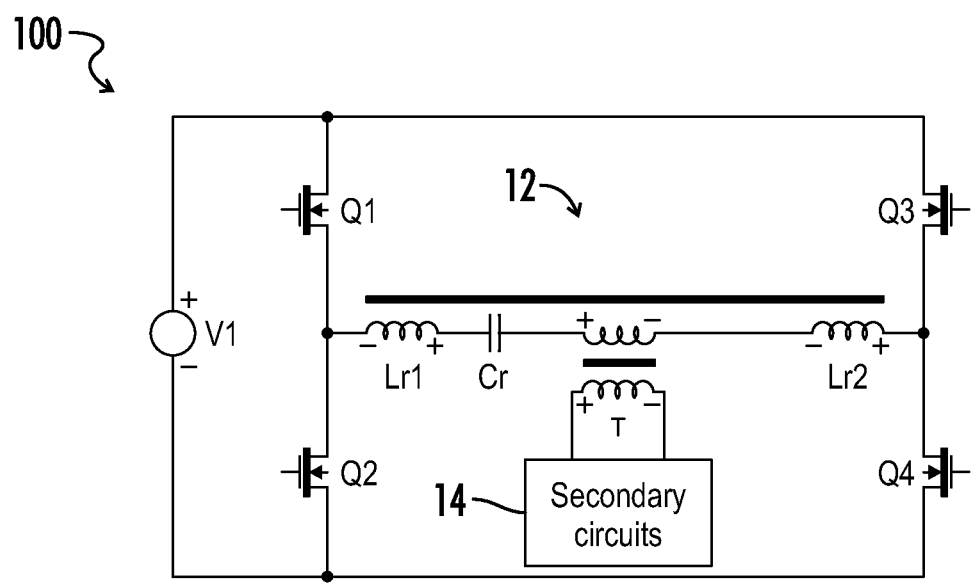
FIG. 10 is a circuit diagram representing another topology of a power converter according to an embodiment according to the present invention, with a single resonant capacitor and two resonant inductors sharing the same magnetic path.
Figure 11:
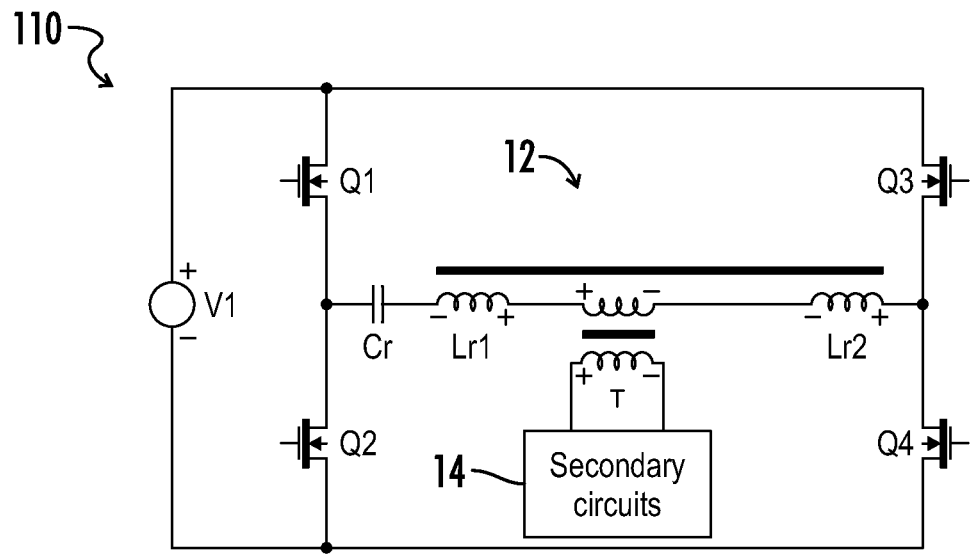
FIG. 11 is a circuit diagram representing another topology of a power converter according to an embodiment according to the present invention, where the resonant capacitor is connected between a switching branch and the Lr1 inductor, and wherein the resonant chokes share the same magnetic path.

Another embodiment of a DC-DC converter topology may be as shown in FIG. 7. This converter topology 70 includes a split resonant choke Lr1/Lr2 which utilizes the same magnetic core, i.e. the magnetic fluxes share the same path. This embodiment allows for a higher power density of the converter while still gaining benefits of the embodiment as previously described according to FIG. 4.

Taking into account that the voltage across the resonant capacitors Cr1 and Cr2 remains substantially unchanged during the switching transitions, any ratio between capacitance of Cr1 and capacitance of Cr2 can be chosen providing that Cr1*Cr2/(Cr1+Cr2) is kept constant. Therefore, capacitors Cr1 and Cr2 can be integrated into a single resonant capacitor. In this case, the center point voltage Vm is still free of voltage transients with higher dv/dt. However, the center point voltage Vm may be characterized by an AC voltage 61, as depicted on FIG. 6, having mainly a fundamental frequency component given by the switching frequency of the converter. Because the center point voltage Vm essentially governs the common mode voltage between the primary and secondary circuits, the common mode voltage features a similar shape 61 as well. If an application allows for such a low frequency common mode voltage, or if a common mode filter implementation is efficient to dampen low frequency common mode voltages, then the converter can be simplified and a single resonant capacitor can be positioned anywhere within the lateral branch of the converter. As a result, other embodiments of a power converter topology 80, 90, 100, 110 may be obtained as represented in FIGS. 8-11, respectively.

If an application requires a single resonant capacitor and if it is further required to decrease the RMS value of the common mode voltage between the primary and secondary circuits, then the chokes Lr1 and Lr2 can be intentionally designed with an inductance ratio other than 1:1. Another reason to do this is the eventual existence of asymmetry of the isolation transformer T characterized by unequal inter-winding capacitances. In each of these cases, the inductance ratio of Lr1 and Lr2 may be different than 1:1 and provides optimal common mode voltage in the respective application.

The previous detailed description has been provided for the purposes of illustration and description. Thus, although there have been described particular embodiments of a new and useful invention, it is not intended that such references be construed as limitations upon the scope of this invention except as set forth in the following claims.

What is claimed is:

1. A resonant DC/DC power converter comprising:
    a primary circuit further comprising
        a first inverter branch comprising a first pair of switches coupled in series across an input power source and connected together at a first output node,
        a second inverter branch comprising a second pair of switches coupled in series across the input power source and connected together at a second output node, and
        a resonant tank branch laterally coupled between the first and second output nodes, the resonant tank branch comprising first and second resonant capacitors, a primary winding of an isolation transformer and a split resonant inductor having two separate windings,
        wherein the resonant tank branch further defines first and second impedance circuits on opposing sides of the primary winding and having equivalent impedance values; and
    a secondary circuit coupled to a secondary winding of the isolation transformer,
    wherein in response to symmetrical switching of the first and second pairs of switches, a center point voltage of the primary transformer winding is substantially free of stepwise voltage changes.

2. The power converter of claim 1, wherein the two separate windings of the split resonant inductor comprise equivalent parasitic capacitances.

3. The power converter of claim 1, wherein the split resonant inductor utilizes a common magnetic core and substantially shares a common path of magnetic flux.

4. The power converter of claim 3, wherein the split resonant inductor is further characterized by an m:n inductance ratio of substantially 1:1.

5. The power converter of claim 3, wherein the split resonant inductor is further characterized by an m:n inductance ratio different from 1:1, having a value provided to optimize a common mode voltage between the primary and secondary circuits.

6. The power converter of claim 1, wherein:
    the split resonant inductor comprises two independent inductors; and
    the split resonant inductor is further characterized by m:n inductance ratio.

7. The power converter of claim 6, wherein the split resonant inductor is further characterized by an m:n inductance ratio of substantially 1:1.

8. The power converter of claim 6, wherein the m:n inductance ratio is different from 1:1, having a value provided to optimize a common mode voltage between the primary and secondary circuits.

9. The power converter of claim 1, wherein the first and second resonant capacitors comprise two separate components of a split resonant capacitor.

10. The power converter of claim 1, the secondary circuit further comprising a rectifier circuit coupled across the secondary isolation transformer winding and configured to produce a DC output to a load.

11. The power converter of claim 10, the rectifier circuit comprising a plurality of synchronous rectifier switching elements arranged in a bridge configuration.

12. A resonant DC-DC power converter comprising:
- a first pair of switching elements coupled in series across an input power source;
- a second pair of switching elements coupled in series across the input power source, wherein first and second outputs are produced at nodes between the respective pairs of switching elements;
- a first impedance circuit coupled to the node between the first pair of switching elements and comprising a first impedance value;
- a second impedance circuit coupled to the node between the second pair of switching elements and comprising a second impedance value, the first and second impedance values being substantially identical;
- a primary winding of an isolation transformer coupled in series between the first and second impedance circuits; and
- wherein synchronous switching of opposing switching elements from the first and second pairs of switching elements produces a substantially DC voltage as a center point voltage of the isolation transformer.

13. The power converter of claim 12, wherein the first impedance circuit comprises a first winding of a split resonant inductor and the second impedance circuit comprises a second winding of the split resonant inductor.

14. The power converter of claim 13, wherein the first and second windings of the split resonant inductor utilize a common magnetic core and substantially share a common path of magnetic flux.

15. The power converter of claim 13, wherein the first and second windings of the split resonant inductor are further characterized by an m:n inductance ratio of substantially 1:1.

16. A method of operating a resonant DC-DC power converter having first and second switching inverter branches in a bridge configuration on a primary side of an isolation transformer, each of the first and second branches comprising respective pairs of switches coupled in series across an input power source and connected at an output node for the branch, the method comprising:
- providing a resonant circuit between the respective output nodes for the first and second branches, the resonant circuit comprising first and second impedance circuits disposed on opposing ends of a primary winding for the isolation transformer, said first and second impedance circuits having substantially identical impedance values;
- controlling diagonally opposed switching elements of the inverter branches to switch on and off synchronously, wherein symmetrical output waveforms are produced; and
- generating a center point voltage of the isolation transformer as a substantially DC voltage.

* * * * *